United States Patent
Carlson et al.

(10) Patent No.: US 8,615,586 B2
(45) Date of Patent: Dec. 24, 2013

(54) DISCOVERY OF LOGICAL IMAGES AT STORAGE AREA NETWORK ENDPOINTS

(75) Inventors: Scott M. Carlson, Tuscon, AZ (US); Daniel F. Casper, Poughkeepsie, NY (US); Scott B. Compton, Hyde Park, NY (US); Patricia G. Driever, Poughkeepsie, NY (US); John R. Flanagan, Poughkeepsie, NY (US); Roger G. Hathorn, Tucson, AZ (US); Louis W. Ricci, Hyde Park, NY (US); Dale F. Riedy, Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 12/821,250

(22) Filed: Jun. 23, 2010

(65) Prior Publication Data

US 2011/0320602 A1 Dec. 29, 2011

(51) Int. Cl.
*G06F 15/173* (2006.01)

(52) U.S. Cl.
USPC ........... 709/226; 709/224; 709/238; 709/240; 370/254; 711/164

(58) Field of Classification Search
USPC .................. 709/224–240; 711/164; 370/254
See application file for complete search history.

(56) References Cited

U.S. PATENT DOCUMENTS

| | | | |
|---|---|---|---|
| 4,104,539 A | 8/1978 | Hase | |
| 4,611,319 A | 9/1986 | Naito | |
| 4,644,443 A | 2/1987 | Swensen et al. | |
| 5,027,254 A | 6/1991 | Corfits et al. | |
| 5,438,575 A | 8/1995 | Bertrand | |
| 5,568,365 A | 10/1996 | Hahn et al. | |
| 5,663,919 A | 9/1997 | Shirley et al. | |
| 5,949,646 A | 9/1999 | Lee et al. | |
| 5,963,425 A | 10/1999 | Chrysler et al. | |
| 6,112,311 A | 8/2000 | Beardsley et al. | |
| 6,301,133 B1 | 10/2001 | Cuadra et al. | |
| 6,341,064 B1 | 1/2002 | Bradley | |
| 6,362,942 B2 | 3/2002 | Drapkin et al. | |
| 6,523,140 B1 | 2/2003 | Arndt et al. | |
| 6,538,881 B1 | 3/2003 | Jeakins et al. | |
| 6,594,148 B1 | 7/2003 | Nguyen et al. | |

(Continued)

OTHER PUBLICATIONS

International Search Report for PCT/EP2011/059810, Sep. 14, 2011.

(Continued)

*Primary Examiner* — Wing F Chan
*Assistant Examiner* — Razu Miah
(74) *Attorney, Agent, or Firm* — Canot Colburn LLP; Steven Chiu

(57) ABSTRACT

A method for detecting virtual images in a network, the network including a host system and a plurality of physical devices in operable communication with one another, includes forming a query packet at the host system; providing the query packet to at least one of the plurality of physical devices; forming at the at least of the plurality of physical devices a first vector in response to the query packet, the first vector including a bit for each possible virtual image that may be formed in the at least one of the plurality of devices and indicating which of the virtual images are configured and addressable; and providing the first vector to the host system.

16 Claims, 5 Drawing Sheets

(56) References Cited

U.S. PATENT DOCUMENTS

| | | |
|---|---|---|
| 6,595,018 B2 | 7/2003 | Goth et al. |
| 6,625,648 B1 * | 9/2003 | Schwaller et al. ............ 709/224 |
| 6,658,599 B1 | 12/2003 | Linam et al. |
| 6,845,428 B1 | 1/2005 | Kedem |
| 7,004,233 B2 | 2/2006 | Hasegawa et al. |
| 7,007,099 B1 | 2/2006 | Donati et al. |
| 7,032,052 B2 | 4/2006 | Sauber et al. |
| 7,053,502 B2 | 5/2006 | Aihara et al. |
| 7,075,788 B2 | 7/2006 | Larson et al. |
| 7,093,155 B2 | 8/2006 | Aoki |
| 7,096,308 B2 | 8/2006 | Main et al. |
| 7,107,331 B2 * | 9/2006 | Gava et al. .................... 709/221 |
| 7,134,040 B2 | 11/2006 | Ayres |
| 7,152,136 B1 | 12/2006 | Charagulla |
| 7,163,546 B2 | 1/2007 | Mirizzi et al. |
| 7,206,946 B2 | 4/2007 | Sakakibara et al. |
| 7,219,181 B2 | 5/2007 | Carty |
| 7,260,620 B1 | 8/2007 | Halasz |
| 7,313,643 B2 | 12/2007 | Sakurai et al. |
| 7,464,174 B1 | 12/2008 | Ngai |
| 7,478,167 B2 * | 1/2009 | Ould-Brahim et al. ........ 709/238 |
| 7,535,828 B2 | 5/2009 | Raszuk et al. |
| 7,558,348 B1 | 7/2009 | Liu et al. |
| 7,594,144 B2 | 9/2009 | Brandyberry et al. |
| 7,836,254 B2 | 11/2010 | Gregg et al. |
| 7,873,851 B1 | 1/2011 | Linnell et al. |
| 7,975,076 B2 | 7/2011 | Moriki et al. |
| 8,032,684 B2 | 10/2011 | Pettey et al. |
| 8,041,811 B2 * | 10/2011 | Calippe et al. ................ 709/224 |
| 8,046,627 B2 | 10/2011 | Takubo |
| 8,082,466 B2 | 12/2011 | Tanaka et al. |
| 8,140,917 B2 | 3/2012 | Suetsugu et al. |
| 2002/0049815 A1 * | 4/2002 | Dattatri ........................ 709/206 |
| 2002/0112067 A1 * | 8/2002 | Chang et al. .................. 709/232 |
| 2003/0097503 A1 | 5/2003 | Huckins |
| 2003/0177221 A1 * | 9/2003 | Ould-Brahim et al. ....... 709/223 |
| 2003/0200477 A1 | 10/2003 | Ayres |
| 2004/0024905 A1 * | 2/2004 | Liao et al. ..................... 709/239 |
| 2004/0130868 A1 | 7/2004 | Schwartz et al. |
| 2004/0136130 A1 | 7/2004 | Wimmer et al. |
| 2005/0024187 A1 | 2/2005 | Kranz et al. |
| 2005/0116546 A1 | 6/2005 | Zeighami et al. |
| 2005/0160214 A1 | 7/2005 | Sauber et al. |
| 2005/0162830 A1 | 7/2005 | Wortman et al. |
| 2005/0213513 A1 * | 9/2005 | Ngo et al. ..................... 370/254 |
| 2005/0276017 A1 | 12/2005 | Aziz et al. |
| 2005/0289278 A1 | 12/2005 | Tan et al. |
| 2006/0053339 A1 | 3/2006 | Miller et al. |
| 2006/0085150 A1 | 4/2006 | Gorin |
| 2006/0095607 A1 | 5/2006 | Lim et al. |
| 2006/0206639 A1 | 9/2006 | Tee et al. |
| 2006/0236054 A1 * | 10/2006 | Kitamura ....................... 711/165 |
| 2006/0291447 A1 * | 12/2006 | Siliquini et al. ............... 370/352 |
| 2007/0008663 A1 | 1/2007 | Nakashima et al. |
| 2007/0078996 A1 * | 4/2007 | Chen et al. .................... 709/230 |
| 2007/0211430 A1 | 9/2007 | Bechtolsheim |
| 2007/0226523 A1 | 9/2007 | Chang |
| 2007/0262891 A1 | 11/2007 | Woodral et al. |
| 2007/0273018 A1 | 11/2007 | Onozuka et al. |
| 2007/0288715 A1 * | 12/2007 | Boswell et al. ................ 711/164 |
| 2008/0065796 A1 | 3/2008 | Lee et al. |
| 2008/0069141 A1 * | 3/2008 | Bonaguro et al. ............ 370/469 |
| 2008/0077817 A1 | 3/2008 | Brundridge |
| 2008/0147943 A1 * | 6/2008 | Freimuth et al. .............. 710/240 |
| 2008/0192431 A1 | 8/2008 | Bechtolsheim |
| 2008/0263246 A1 | 10/2008 | Larson et al. |
| 2008/0288661 A1 | 11/2008 | Galles |
| 2006/0237636 A1 | 12/2008 | Gurevich et al. |
| 2008/0301487 A1 * | 12/2008 | Hatta et al. ......................... 714/3 |
| 2009/0037682 A1 * | 2/2009 | Armstrong et al. ........... 711/164 |
| 2009/0210527 A1 * | 8/2009 | Kawato ......................... 709/224 |
| 2009/0276551 A1 | 11/2009 | Brown et al. |
| 2009/0276773 A1 | 11/2009 | Brown et al. |
| 2010/0002755 A1 | 1/2010 | Heidari et al. |
| 2010/0005531 A1 | 1/2010 | Largman et al. |
| 2010/0042999 A1 | 2/2010 | Dorai et al. |
| 2010/0077117 A1 | 3/2010 | Asnaashari |
| 2010/0115329 A1 | 5/2010 | Tanaka et al. |
| 2010/0131359 A1 | 5/2010 | Ting et al. |
| 2010/0146089 A1 * | 6/2010 | Freimuth et al. .............. 709/222 |
| 2010/0157463 A1 | 6/2010 | Arizono et al. |
| 2010/0169674 A1 | 7/2010 | Kazama |
| 2010/0205608 A1 | 8/2010 | Nemirovsky et al. |
| 2010/0211714 A1 | 8/2010 | LePage |
| 2010/0287209 A1 | 11/2010 | Hauser |
| 2010/0312894 A1 * | 12/2010 | Awad et al. .................... 709/226 |
| 2011/0029696 A1 | 2/2011 | Uehara |
| 2011/0029734 A1 | 2/2011 | Pope et al. |
| 2011/0131359 A1 | 6/2011 | Pettey et al. |
| 2011/0219161 A1 | 9/2011 | Deshpande et al. |
| 2011/0258352 A1 | 10/2011 | Williams et al. |
| 2011/0265134 A1 | 10/2011 | Jaggi et al. |
| 2011/0320653 A1 | 12/2011 | Lais et al. |
| 2011/0320675 A1 | 12/2011 | Gregg et al. |

OTHER PUBLICATIONS

Final Office Action Received Mar. 2, 2012 for U.S. Appl. No. 12/821,221.

PCI Express Base Specification Rev 1.0a, Apr. 15, 2003 p. 1-2, 31, 35-36, 43-44, 49-51, 55, 59-62, 74, 101.

* cited by examiner

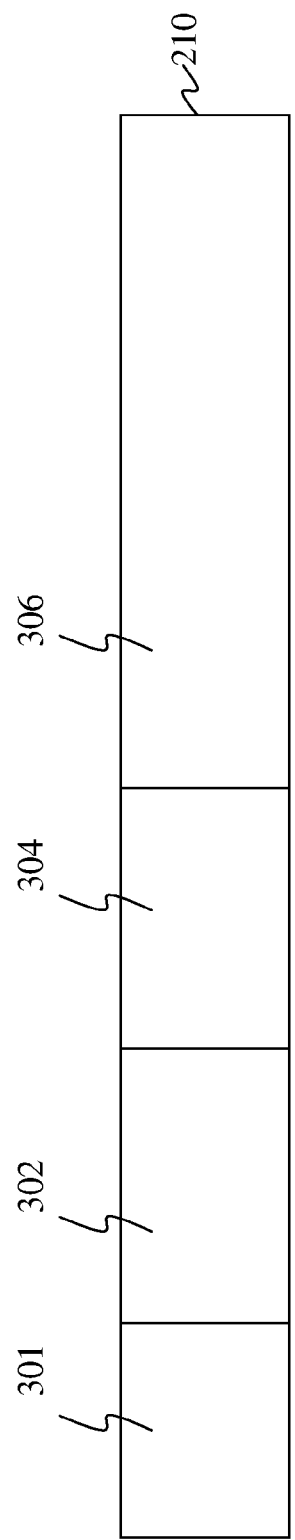

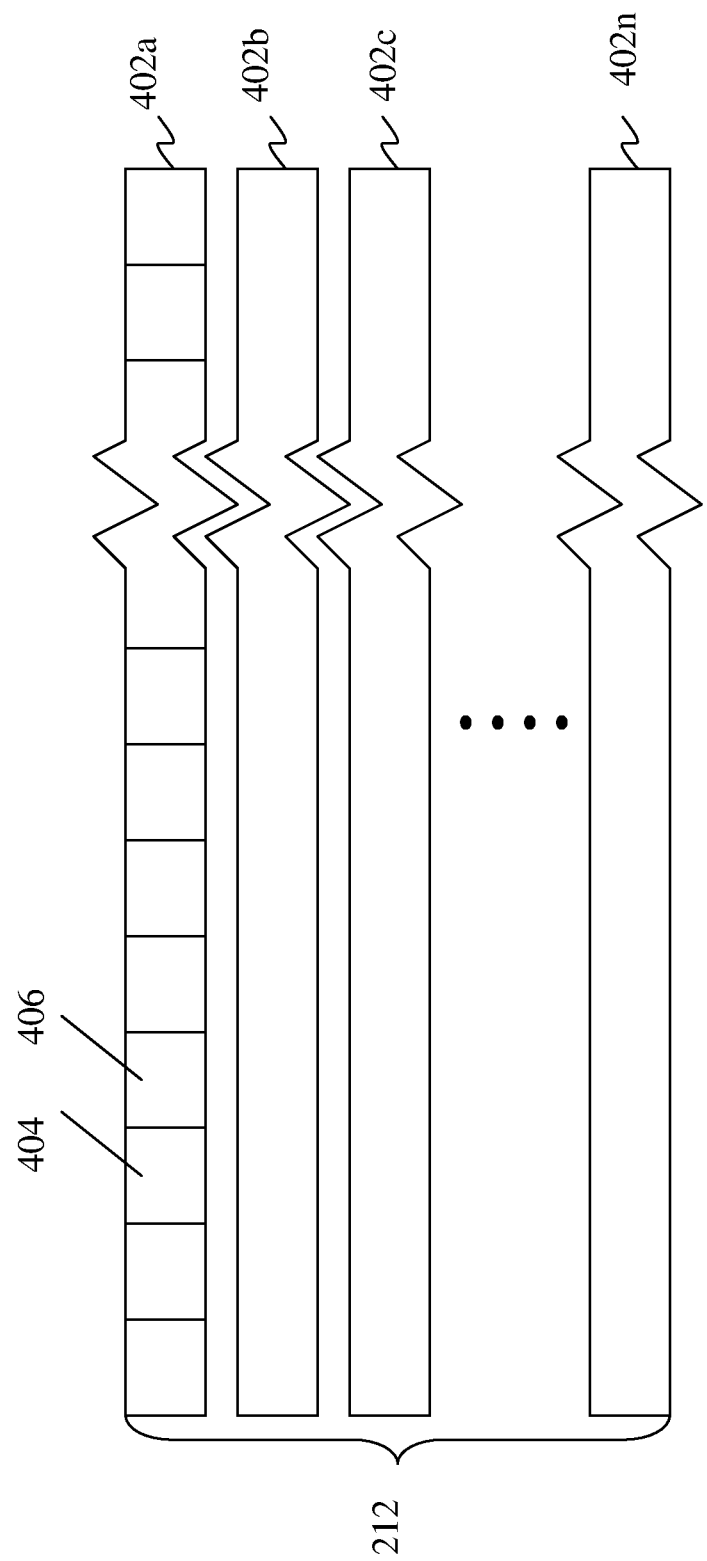

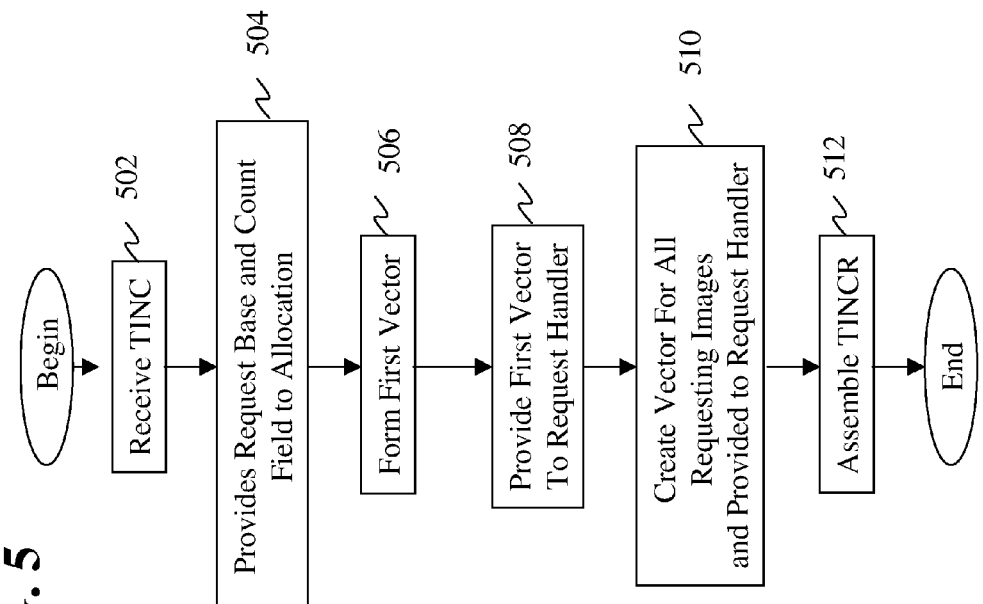

DISCOVERY OF LOGICAL IMAGES AT STORAGE AREA NETWORK ENDPOINTS

BACKGROUND

The present invention relates to computer systems and, more specifically, to discovery of virtual images located at endpoints of a storage area network.

A computer network may include multiple physical nodes (i.e., physical devices). In some instances, one or more of the physical nodes may include virtualization capabilities. Accordingly, each physical node may represent one or more virtual devices. For simplicity, virtual and real devices will both be referred to as "images." For example, a network may include a host computing device coupled to one or more storage devices. The host computing device may be divided into one or more logical partitions (LPARs) and the storage device may be divided into multiple virtual devices.

In order to determine the topology of the network, a network protocol such as the fibre channel protocol may provide commands that allow for topology discovery. Such discovery, however, is currently limited to the discovery of physical nodes (i.e., physical devices). In such a protocol, the commands may be directed to the directory service to determine the number and types of physical nodes registered in the fabric and characteristics about them. The characteristics may include the node's unique name and the protocols supported by the node.

However, because virtualization is provided through mechanisms typically contained within firmware of each physical node, the virtual configuration (e.g. the virtual control units within a storage unit) may not be revealed by these commands. As a result, the logical endpoints of a network behind the physical endpoints are not easily discovered.

In some systems commands exist to determine the current logical connections that exist between LPARS and virtual control units. Specifically, in the FC-SB-4 protocol, the Test Initialization (TIN) FC-SB-4 command may discover the logical control units coupled to a particular LPAR. However, no mechanism exists to discover which of the logical control units has been defined and is addressable (e.g., is available at an "endpoint"). As virtualization of endpoints has become the more widespread, it is advantageous during the discovery process to be able to determine the logical configurations behind the physical nodes, just as it is to discover the physical nodes in the first place.

Currently, for a first logical image (e.g. an LPAR) at one endpoint to determine the existence of another logical image (e.g., a virtual control unit) at another endpoint, the first logical image needs to allocate all possible other logical images at the second endpoint and then determine if each one exists. Such a process, however, is not direct and requires that an inference be made to conclude if a particular logical image exists.

For example, consider a network in which an LPAR is attempting to determine the existence of logical control unit images within a storage device. The LPAR may have to define as many as 256 logical control unit images for the device and as many as 256 devices for each logical control unit. The LPAR then issues commands to each device in order to determine, based on the responses to those commands, whether any device on the logical control unit exists. If a device exists, it can be inferred that the logical control unit exists. With potentially each LPAR needing to determine this information by issuing the same volume of commands, the associated network traffic is multiplied and may lead to network performance degradation.

SUMMARY

According to one embodiment of the present invention, a method for detecting virtual images in a network is provided. The network includes a host system and a plurality of physical devices in operable communication with one another. The method includes: forming a query packet at the host system; providing the query packet to at least one of the plurality of physical devices; forming at the at least one of the plurality of physical devices a first vector in response to the query packet, the first vector including a bit for each possible virtual image that may be formed in the at least one of the plurality of devices and indicating which of the virtual images are configured and addressable; and providing the first vector to the host system.

According to another embodiment of the present invention, a system that includes a host system configured to form a query packet and a physical device coupled to the host system is provided. In this embodiment, the physical device is configured to receive the query packet and to form a first vector in response to the query packet, the first vector including a bit for each possible virtual image that may be formed in the at least one of the plurality of devices and indicating which of the virtual images are configured and addressable.

According to yet another embodiment of the present invention, a system comprising a physical device configured to form a query packet and a host system coupled to the physical device is disclosed. in this embodiment, the host system is configured to receive the query packet and to form a first vector in response to the query packet, the first vector including a bit for each possible virtual image that may be formed in the host system and indicating which of the virtual images are configured and addressable.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 shows an example of a query packet;

FIG. 4 shows an example of a query response; and

FIG. 5 shows a method according to one embodiment of the present invention.

DETAILED DESCRIPTION

In view of the performance and resource consumption problems described above, embodiments of the present invention may provide systems and methods for endpoint determination. In one embodiment this may include determining each virtual image that has been allocated within a physical node.

In one embodiment, the physical node may receive a query packet. The physical node may include programming (in either hardware, software, or a combination of both) that generates a particular response to the query packet. The response packet may indicate which of the possible virtual images within the physical node have been allocated. This response packet may, therefore, decrease the number of packets/commands that a logical image on a physical node needs to send to each other node in order to determine the logical images behind the other nodes.

In one embodiment, usage of this new packet can decrease the number of packets which must be sent as part of logical fabric discovery to fewer than 1% of the number currently required. Accordingly, embodiments disclosed herein may decrease the number of discovery packets which need to be sent and eliminates the need for resource consumption to discover non-existent images. Embodiments of the present invention may also reduce the time it takes to dynamically define/change the host resources to be associated with each image just to test the existence of each image.

Figure 1:
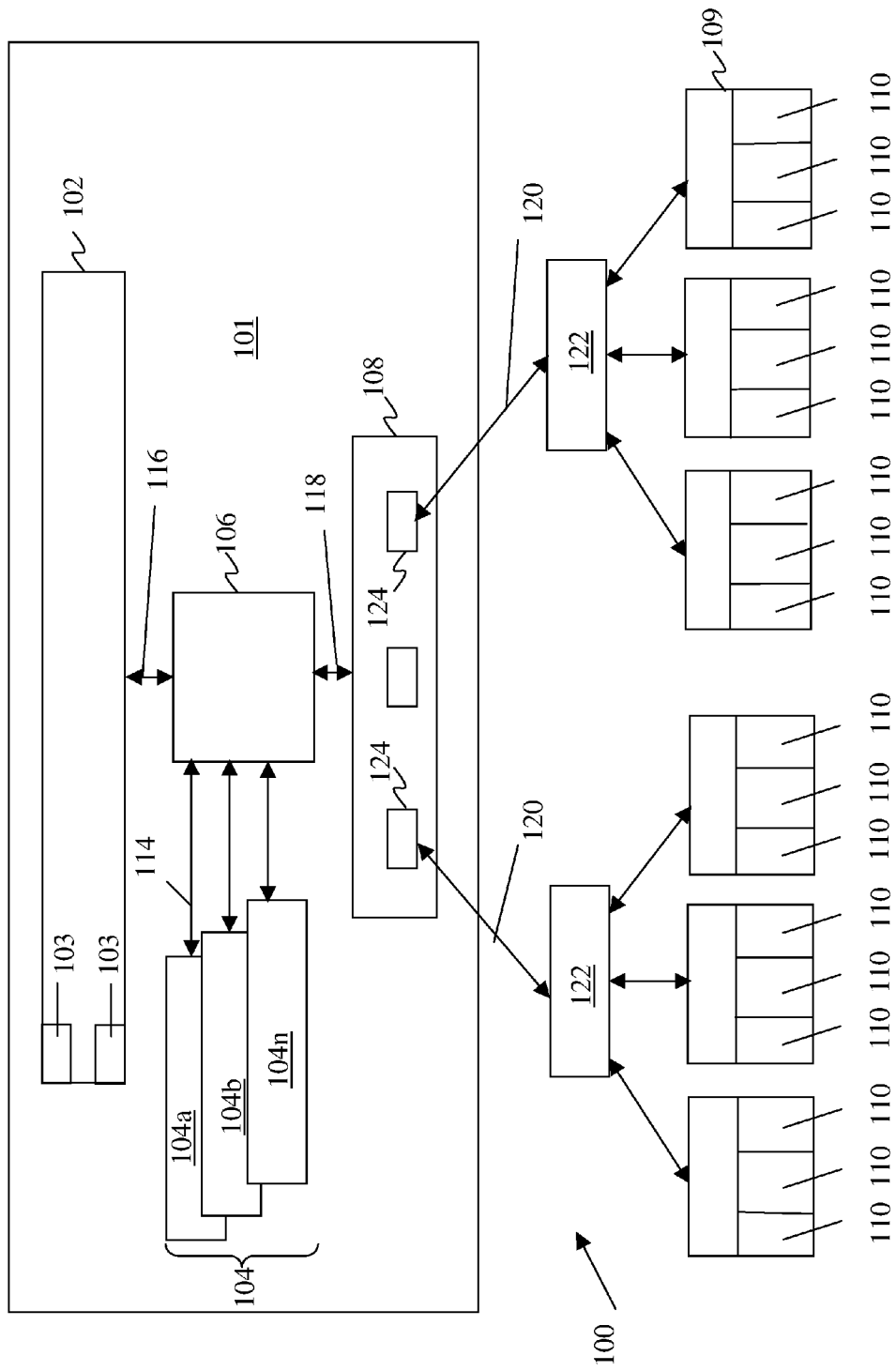
FIG. 1 shows a system on which the embodiments of the present invention may be implemented.

FIG. 1 shows a system 100 on which embodiments of the present invention may be implemented. The system 100 includes a host system 101, which further includes for instance, a main memory 102, one or more logical partition (LPARs) 104 (104a-104n), a storage control element 106, and a channel subsystem 108. The host system 101 may be a large scale computing system, such as a mainframe or server.

The system 100 may also include one or more physical devices 109. The physical devices 109 may be, for example, storage devices. In embodiment, one or more of the physical devices 109 may include two or more virtual images 110. Each virtual image 110 may be coupled to one or more devices. In the case where the physical device is a storage unit, each virtual image 110 may be coupled to a particular memory range of the memory contained in storage unit.

Main memory 102 stores data and programs and may receive data from or provide data to the virtual images 110. For example, the main memory 102 may include one or more operating systems (OSs) 103 that are executed by one or more of the LPARs 104. For example, one LPAR 104 can execute a Linux® operating system 103 and a another LPAR 104 can execute a z/OS® operating system 103 as different virtual machine instances. The main memory 102 is directly addressable and provides for high-speed processing of data by the LPARs 104 and the channel subsystem 108.

The LPARs 104 are the controlling center of the system 100. They provide sequencing and processing facilities for instruction execution, interruption action, timing functions, initial program loading, and other machine-related functions. LPARs 104 are coupled to the storage control element 106 via a connection 114, such as a bidirectional or unidirectional bus.

Storage control element 106 is coupled to the main memory 102 via a connection 116, such as a bus and to channel subsystem 108 via a connection 118. Storage control element 106 controls, for example, queuing and execution of requests made by LPARs 104 and channel subsystem 108.

In an exemplary embodiment, channel subsystem 108 provides a communication interface between host system 101 and the physical devices 109. Channel subsystem 108 is coupled to storage control element 106, as described above, and to each of the physical devices via a connection 120, such as a serial link. Connection 120 may be implemented as an optical link, employing single-mode or multi-mode waveguides in a Fibre Channel fabric.

Channel subsystem 108 directs the flow of information between virtual images 110 (and the memory they are coupled to) and main memory 102. It relieves the LPARs 104 of the task of communicating directly with the physical devices and permits data processing to proceed concurrently with I/O processing.

Each channel 124 within the channel subsystem 108 may be coupled to one or more switches 122. The switches 122 may provide the capability of physically interconnecting any two links that are attached to the switch 122. Each switch 122 may be connected to one or more physical devices 109.

As discussed above, the channel subsystem 108 is coupled to one or more physical devices 109. Each physical device 109 includes one or more virtual images 110. The virtual images 110, in one embodiment, may provide logic to operate and control one or more devices or memory ranges.

One or more of the above components of the system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

From FIG. 1 it can be seen that each physical device 109 includes a multiple virtual images 110. While the following description may be focused on discovering images "behind" the physical device 109, it shall be understood that the teachings herein may be utilized to discover the images behind the host system 101. For instance, the physical device 109 may utilize the teachings herein to discover the images (represented as LPARs 104) in the host system 101.

In the prior art, to discover all of the virtual images 110 in each physical device 109, an LPAR (for example, LPAR 104a) would have had to define each virtual image 110. Then, the LPAR 104a would have sent a command to each image and awaited a response. If a positive response was received, the virtual image 110 existed. As the number of LPARs increases and the number of virtual images 110 increase, discovery in this manner may, as described above, have adverse effects on the network 100 due to traffic increases.

Figure 2:
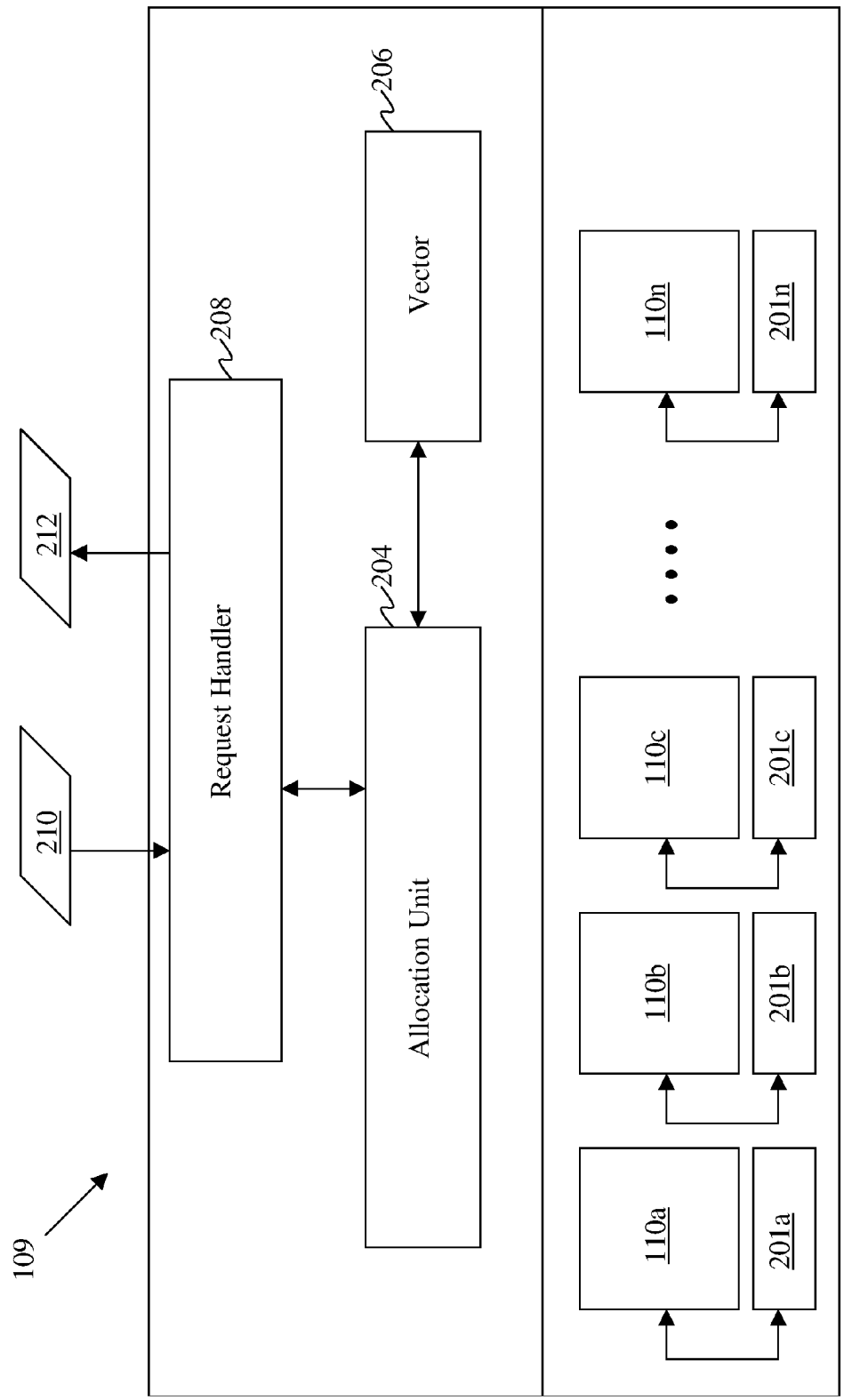
FIG. 2 shows an example of a physical device according one embodiment.

FIG. 2 is more detailed depiction of a physical device 109 according to one embodiment. The physical device 109 may include two or more logical images 110a-110n. Each logical image 110 may be coupled to a controlled element 201. In general, the logical image 110 controls operation of the controlled element 201.

In one embodiment, the logical images 110 are logical control units. In that embodiment, the logical control units 110 control the operation of one or more input/output devices. Accordingly, in that embodiment, the controlled elements 201 may be input/output devices. In another embodiment, the logical images 110 control access to memory ranges in a storage device. In such an embodiment, the controlled elements 201 are memory ranges. In one embodiment, one or more of the logical images 110 may be coupled to one or more controlled elements 201. The controlled elements 201 may be located within or outside of the physical device 109.

In one embodiment, from the point of view of a device external to the physical device 109, the logical images 110 are "behind" the physical device 109. The number of logical images 110 may vary between 1 and 256 and each logical image 110 may be coupled to up to 256 controlled elements 201. Furthermore, each controlled elements 201 are "behind" the logical images 110.

The physical device 109 may include an allocation unit 204. The allocation unit 204 may form or otherwise define the logical images 110 based on configuration files or user input. In one embodiment, the allocation unit 204 creates a vector 206. The vector 206 may include a bit position for each possible logical image 110. For example, if the control unit 110 may support 256 logical control units, the vector may be 256 bits wide and contain an indication in each bit if the corresponding logical control unit is defined and addressable. The vector 206 may be created when logical images 110 are created or at later time.

It should be understood that the allocation unit 204 may form a different 256 bit vector for each possible requester (e.g., LPAR) in the host system. The allocation unit 204 may include instructions that indicate that it is only allowed to provide information about certain logical control units 110 to particular requesters. In such a case, any "disallowed" logical control units 110 for a particular LPAR are indicated as non-addressable in the vector.

The physical device 109 may also include a request handler 208. The request handler 208 may receive a query request 210 and produce a query response 212.

FIG. 3 shows an example of a query request 210. The query request 210 includes a physical device identification 301 that identified the physical device being queried. In one embodiment, the requesting device may get this identification from the namespace.

The query request 210 also includes a query command 302. The query command 302 indicates that the requesting device (e.g., host system 101 of FIG. 1) is requesting the configuration state and addressability of network endpoints (e.g., logical control units 110 of FIG. 2). In one embodiment, such a command may be known as a Test Initialization Capability (TINC) command. Accordingly, while not a complete depiction, in one embodiment, the query request 210 may be referred to as a TINC packet or, simply, as a TINC.

The query request 210 may also include a request base 304. The request base indicates the number of the base requesting image of the requesting device. For example, the request based 304 may identify one of the several LPARs 104 of the host system 101. The query request 210 may also include a count field 306. The count field 306 indicates the number of requesting images, starting from the request base 304, that are participating in the request. In one embodiment, the request base may vary from a value of the 0 to 256. It shall be understood from the following description, that the count field 306 determines the size of the query response 212 (FIG. 2). If shall also be understood that the query request 210 may include more information than shown in FIG. 3.

FIG. 4 is an example of query response 212. The query response 212 may be referred to as a TINC response or TINCR. The query response 212 includes at least a first vector 402a. The first vector 402a has a width equal to the number of possible logical control units that may be formed in the physical device receiving the request. In one embodiment, the first vector 402a has a width of 256 bits. The first vector 402a represents the logical control units (endpoints) that the LPAR at the request base has access to and that have been configured and addressable.

The query response 212 may include up to n−1 additional vectors (402b-402n) where n is equal to the count 306 (FIG. 3). In one embodiment, n is equal to the number of LPARs in a host system. Each bit (e.g. bits 404 and 406) in the vectors indicate whether a particular virtual image is configured and addressable. In one embodiment, a one in a particular location indicates that the virtual image is configured and addressable by the requesting LPAR. Of course, the query response 212 may include the request base or other means to identify the requesting image (LPAR) that corresponds to the first vector 402a.

FIG. 5 shows a method of forming a TINCR according to one embodiment and will be described with reference to FIG. 2. At a block 502 a TINC is received. The TINC may include request base and a count in one embodiment. The TINC may be received by the request handler 208. At a block 504, the request handler 504 provides the request base and count field to the allocation unit 204. At a block 506, the allocation unit 204 then causes a vector 206 for the image of the request base to be produced. The vector 206 includes a bit for each logical control unit 110. The allocation unit 204 fills each bit with a one or zero depending on whether the logical control unit 110 corresponding to that bit is configured and addressable by the requesting image (e.g. LPAR 104 of FIG. 1). In some cases, not every logical control unit 110 is accessible by every requesting image. Accordingly, the configuration or other files may provide the allocation unit 204 information about which bits it can indicate are configured and addressable based on the identify of the requesting image.

At a block 508, the vector 206 is provided to the request handler. At a block 510, a vector for each subsequent requesting image is produced in the same manner as described above. At a block 512 each of vectors received in steps 506 and 508 are assembled into a TINCR and returned to the host system 101.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting logical images in a network, the network including a host system and a plurality of physical devices in operable communication with one another, the method comprising:
   forming a query packet at the host system;
   providing the query packet to at least one of the plurality of physical devices;
   forming at the at least one of the plurality of physical devices a first vector in response to the query packet, the first vector including a bit for each possible virtual image that may be formed in the at least one of the plurality of devices and indicating which of the virtual images are configured and addressable; and
   providing the first vector to the host system;
   wherein the query packet includes a requester base and count field;
   wherein the requester base indicates a first virtual image formed on the host system that is requesting the first vector and wherein forming includes indicating only the virtual images that are configured and addressable and available to the first virtual image; and
   wherein the count indicates a range of requesting virtual images formed on the host system beginning with the first virtual image and wherein an additional vector is formed for each virtual image in the range.

2. The method of claim 1, wherein the providing the first vector includes providing the additional vectors to the host system.

3. The method of claim 1, wherein the count field may include a count up to 256.

4. The method of claim 1, wherein the first vector is 256 bits wide.

5. The method of claim 1, wherein each possible virtual image may be coupled to a controlled element.

6. The method of claim 5, wherein the controlled element is an input/output device.

7. The method of claim 5, wherein the controlled element is a range of memory.

8. The method of claim 1, wherein at least one of the physical devices is a storage control unit.

9. A system comprising:
   a host system configured to form a query packet;
   a physical device coupled to the host system and configured to receive the query packet and to form a first vector in response to the query packet, the first vector including a bit for each possible virtual image that may be formed in the at least one of the plurality of devices and indicating which of the virtual images are configured and addressable;
   wherein the query packet includes a requester base and count field;
   wherein the requester base indicates a first logical partition (LPAR) formed on the host system that is requesting the first vector and wherein the first vector indicates only the virtual images that are configured and addressable and available to the first LPAR; and
   wherein the count indicates an a range of requesting LPARs on formed on the host system beginning with the first LPAR.

10. The system of claim 9, wherein the physical device is further configured to providing the first vector to the host system.

11. The system of claim 9, further comprising:
    a switch connected between the host system and the physical device.

12. The system of claim 9, wherein the host system is divided into two or more logical partitions (LPARs).

13. The system of claim 9, wherein each possible virtual image is be coupled to a controlled element.

14. The system of claim 13, wherein the controlled element is an input/output device.

15. The system of claim 13, wherein the controlled element is a range of memory.

16. The system of claim 9, wherein the physical device is a storage control unit.

* * * * *